US012658602B2

(12) United States Patent
Sakr

(10) Patent No.: US 12,658,602 B2
(45) Date of Patent: Jun. 16, 2026

(54) ANTENNA ARRAYS WITH HIGH ISOLATION BETWEEN ANTENNA ELEMENTS

(71) Applicant: Analog Devices International Unlimited Company, County Limerick (IE)

(72) Inventor: Ahmed Sakr, Cairo (EG)

(73) Assignee: ANALOG DEVICES INTERNATIONAL UNLIMITED COMPANY, County Limerick (IE)

( * ) Notice: Subject to any disclaimer, the term of this patent is extended or adjusted under 35 U.S.C. 154(b) by 122 days.

(21) Appl. No.: 18/594,313

(22) Filed: Mar. 4, 2024

(65) Prior Publication Data

US 2025/0279591 A1 Sep. 4, 2025

(51) Int. Cl.
*H01Q 21/24* (2006.01)
*H01Q 21/00* (2006.01)

(52) U.S. Cl.
CPC ......... *H01Q 21/24* (2013.01); *H01Q 21/0006* (2013.01)

(58) Field of Classification Search
CPC .. H01Q 21/0006; H01Q 21/06; H01Q 21/065; H01Q 21/08; H01Q 21/24; H01Q 21/245
See application file for complete search history.

(56) References Cited

U.S. PATENT DOCUMENTS 6,147,648 A * 11/2000 Granholm ............ H01Q 21/065 343/700 MS
10,741,931 B2 * 8/2020 Howard ............... H01Q 21/065
12,107,330 B2 * 10/2024 Sakr ........................ H01Q 15/24
12,547,576 B2 * 2/2026 Ryan ................... G06F 13/4282
2005/0206568 A1 * 9/2005 Phillips .................... H01Q 5/40 343/700 MS
2005/0264451 A1 * 12/2005 Aikawa ................ H01Q 21/065 343/700 MS (Continued)

OTHER PUBLICATIONS

Alibakhshikenari, Mohammad, et al. "High-isolation antenna array using SIW and realized with a graphene layer for sub-terahertz wireless applications." Scientific Reports 11.1 (2021): 10218.

(Continued)

*Primary Examiner* — Jason M Crawford
(74) *Attorney, Agent, or Firm* — Knobbe, Martens, Olson & Bear, LLP

(57) ABSTRACT

Antenna arrays with high isolation between antenna elements are disclosed herein. In certain embodiments, an antenna array includes at least one primary antenna element and at least one secondary antenna element. The primary antenna element includes a first port of a first signal polarization type (for instance, horizontal) and a second port of a second signal polarization type (for instance, vertical), which are connected to a first signal feed and a second signal feed, respectively. The secondary antenna element includes a first port of the first signal polarization type connected to the first port of the primary antenna element by way of a first signal delay line, and a second port of the second signal polarization type connected to the second port of the primary antenna element by way of a second signal delay line.

20 Claims, 9 Drawing Sheets

(56) References Cited

U.S. PATENT DOCUMENTS

| | | | | |
|---|---|---|---|---|
| 2008/0094296 | A1* | 4/2008 | Lee | H01Q 3/26 343/754 |
| 2013/0234908 | A1* | 9/2013 | Howard | H01Q 1/523 343/853 |
| 2017/0310017 | A1* | 10/2017 | Howard | H01Q 21/0006 |
| 2018/0062272 | A1* | 3/2018 | Haziza | H01Q 21/0087 |
| 2023/0155270 | A1 | 5/2023 | Sakr et al. | |
| 2023/0253709 | A1* | 8/2023 | Sakr | H01Q 9/045 343/702 |
| 2023/0261392 | A1* | 8/2023 | Sakr | H01Q 1/521 343/702 |
| 2024/0055765 | A1 | 2/2024 | Sakr | |
| 2024/0275058 | A1* | 8/2024 | Sakr | H01Q 21/065 |
| 2025/0038409 | A1* | 1/2025 | Sakr | H01Q 21/062 |
| 2025/0038427 | A1* | 1/2025 | Sakr | H01Q 21/26 |
| 2025/0112372 | A1* | 4/2025 | Sakr | H01Q 9/0435 |
| 2025/0260166 | A1* | 8/2025 | Sakr | H01Q 9/285 |
| 2025/0279591 | A1* | 9/2025 | Sakr | H01Q 1/523 |

OTHER PUBLICATIONS

A. B. Abdel-Rahman and M. Aboualalaa, "Improving Isolation Between Antenna Array Elements Using Lossy Microstrip Resonators," 2019 13th European Conference on Antennas and Propagation (EuCAP), Krakow, Poland, 2019, pp. 1-4.

J. Donnellan, "A spiral-doublet scanning array," in IRE Transactions on Antennas and Propagation, vol. 9, No. 3, pp. 276-279, May 1961, doi: 10.1109/TAP.1961.1144997.

* cited by examiner

ANTENNA ARRAYS WITH HIGH ISOLATION BETWEEN ANTENNA ELEMENTS

FIELD OF THE DISCLOSURE

Embodiments of the invention relate to electronic systems, and more particularly, to antennas for radio frequency (RF) communications.

BACKGROUND

Antennas can be used in a wide variety of applications to transmit and/or receive radio frequency (RF) signals. Example applications using antennas include radar, satellite, military, and/or cellular communications.

SUMMARY OF THE DISCLOSURE

Antenna arrays with high isolation between antenna elements are disclosed herein. In certain embodiments, an antenna array includes at least one primary antenna element and at least one secondary antenna element. The primary antenna element includes a first port of a first signal polarization type (for instance, horizontal) and a second port of a second signal polarization type (for instance, vertical), which are connected to a first signal feed and a second signal feed, respectively. The secondary antenna element includes a first port of the first signal polarization type connected to the first port of the primary antenna element by way of a first signal delay line, and a second port of the second signal polarization type connected to the second port of the primary antenna element by way of a second signal delay line. Thus, the secondary antenna element includes ports that are connected to the ports of a corresponding primary antenna element by way of signal delay lines. Such an antenna array configuration has been found to exhibit low coupling.

In one aspect, an antenna array includes a primary antenna element having a first port of a first signal polarization type, a first signal feed connected to the first port of the primary antenna element, a secondary antenna element having a first port of the first signal polarization type, and a first signal delay line connecting the first port of the primary antenna element to the first port of the secondary antenna element.

In another aspect, a radio frequency communication system includes a front end system and an antenna array electrically connected to the front end system. The antenna array includes a primary antenna element having a first port of a first signal polarization type, a first signal feed connected to the first port of the primary antenna element, a secondary antenna element having a first port of the first signal polarization type, and a first signal delay line connecting the first port of the primary antenna element to the first port of the secondary antenna element.

In another aspect, a method of antenna array formation is provided. The method includes forming a primary antenna element having a first port of a first signal polarization type, forming a first signal feed connected to the first port of the primary antenna element, forming a secondary antenna element having a first port of the first signal polarization type, and forming a first signal delay line connecting the first port of the primary antenna element to the first port of the secondary antenna element.

DETAILED DESCRIPTION OF EMBODIMENTS

The following detailed description of embodiments presents various descriptions of specific embodiments of the invention. However, the invention can be embodied in a multitude of different ways. In this description, reference is made to the drawings. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Figure 1:
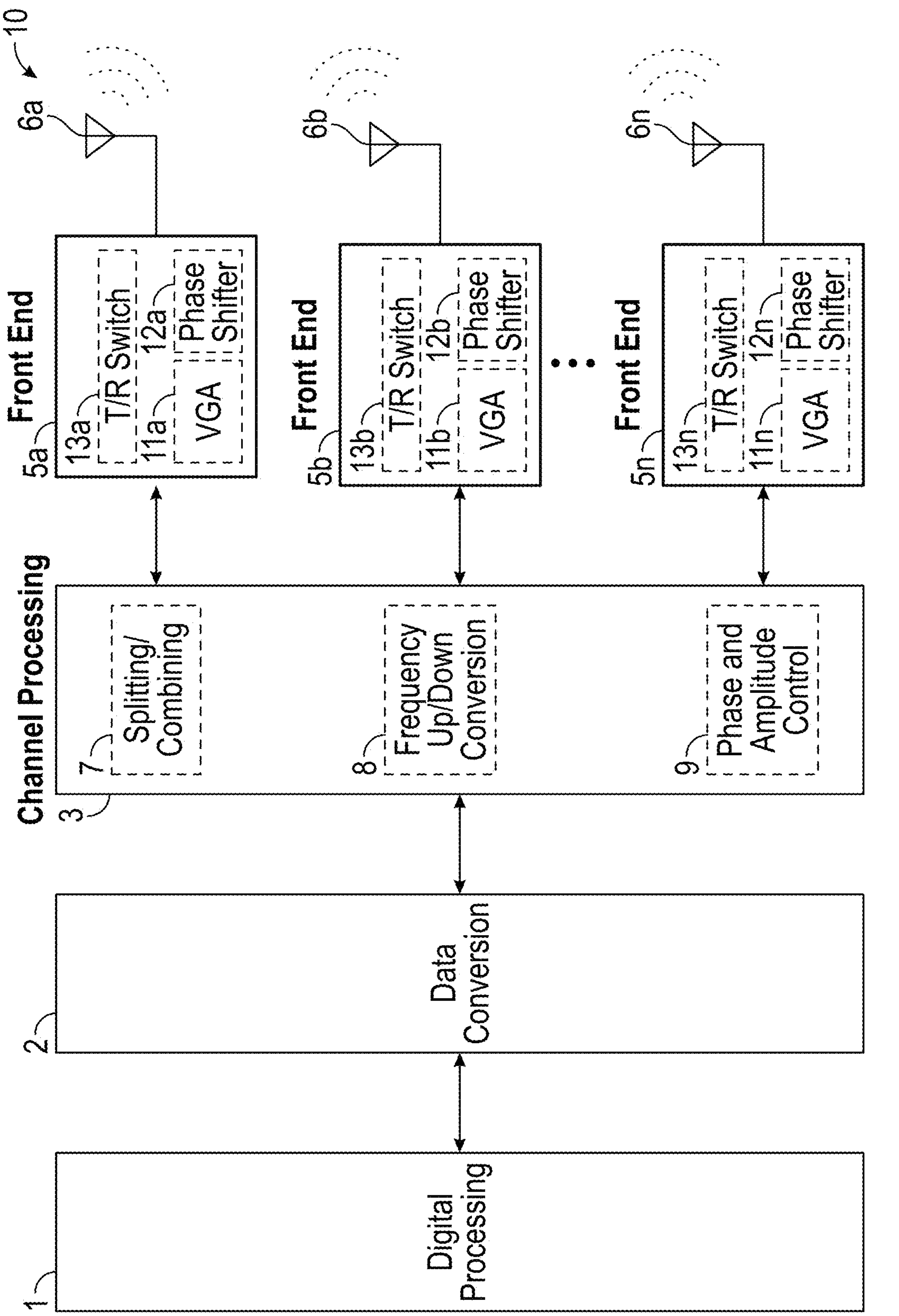
FIG. 1 is a schematic diagram of one embodiment of a phased array antenna system.

FIG. 1 is a schematic diagram of one embodiment of a phased array antenna system 10. The phased array antenna system 10 includes a digital processing circuit 1, a data conversion circuit 2, a channel processing circuit 3, RF front ends 5*a*, 5*b*, . . . 5*n*, and an antenna array that includes antennas 6*a*, 6*b*, . . . 6*n*. Although an example system with three RF front ends and three antennas is illustrated, the phased array antenna system 10 can include more or fewer RF front ends and/or more or fewer antennas as indicated by the ellipses. Furthermore, in certain implementations, the phased array antenna system 10 is implemented with separate antennas for transmitting and receiving signals.

The phased array antenna system 10 illustrates one embodiment of an electronic system that can include one or more antenna arrays implemented in accordance with the teachings herein. However, the antenna arrays disclosed herein can be used in a wide range of electronics. A phased array antenna system is also referred to herein as an active scanned electronically steered array or beamforming communication system.

As shown in FIG. 1, the channel processing circuit 3 is coupled to antennas 6*a*, 6*b*, . . . 6*n* through RF front ends 5*a*, 5*b*, . . . 5*n*, respectively. The channel processing circuit 3 includes a splitting/combining circuit 7, a frequency up/down conversion circuit 8, and a phase and amplitude control circuit 9, in this embodiment. The channel processing circuit 3 provides RF signal processing of RF signals transmitted by and received from each communication channel. In the illustrated embodiment, each communication channel is associated with a corresponding RF front end and antenna. However, other implementations are possible.

With continuing reference to FIG. 1, the digital processing circuit 1 generates digital transmit data for controlling a transmit beam radiated from the antennas 6*a*, 6*b*, . . . 6*n* of the antenna array. The digital processing circuit 1 also processes digital receive data representing a receive beam received by the antennas 6*a*, 6*b*, . . . 6*n* of the antenna array. In certain implementations, the digital processing circuit 1 includes one or more baseband processors.

As shown in FIG. 1, the digital processing circuit 1 is coupled to the data conversion circuit 2, which can include digital-to-analog converter (DAC) circuitry for converting digital transmit data to one or more baseband transmit signals and analog-to-digital converter (ADC) circuitry for converting one or more baseband receive signals to digital receive data.

The frequency up/down conversion circuit 8 provides frequency upshifting from baseband to RF and frequency downshifting from RF to baseband, in this embodiment. However, other implementations are possible, such as configurations in which the phased array antenna system 10 operates in part at an intermediate frequency (IF) or in which RF data converters provide direct conversion between digital and RF. In certain implementations, the splitting/combining circuit 7 provides splitting to one or more frequency upshifted transmit signals to generate RF signals suitable for processing by the RF front ends 5*a*, 5*b*, . . . 5*n* and subsequent transmission on the antennas 6*a*, 6*b*, . . . 6*n*. Additionally, the splitting/combining circuit 7 combines RF signals received vias the antennas 6*a*, 6*b*, . . . 6*n* and RF front ends 5*a*, 5*b*, . . . 5*n* to generate one or more baseband receive signals for the data conversion circuit 2.

The channel processing circuit 3 also includes the phase and amplitude control circuit 9 for controlling beamforming operations. For example, the phase and amplitude control circuit 9 controls the amplitudes and phases of RF signals transmitted or received via the antennas 6*a*, 6*b*, . . . 6*n* to provide beamforming.

With respect to signal transmission, the RF signals radiated from the antennas 6*a*, 6*b*, . . . 6*n* aggregate through constructive and destructive interference to collectively generate a transmit beam having a particular direction. With respect to signal reception, the channel processing circuit 3 generates a receive beam by combining the RF signals received from the antennas 6*a*, 6*b*, . . . 6*n* after amplitude scaling and phase shifting.

Phased array antenna systems are used in a wide variety of applications including, but not limited to, mobile communications, military and defense systems, and/or radar technology.

As shown in FIG. 1, the RF front ends 5*a*, 5*b*, . . . 5*n* each include one or more VGAs 11*a*, 11*b*, . . . 11*n*, which are used to scale the amplitude of RF signals transmitted or received by the antennas 6*a*, 6*b*, . . . 6*n*, respectively. Additionally, the RF front ends 5*a*, 5*b*, . . . 5*n* each include one or more phase shifters 12*a*, 12*b*, . . . 12*n*, respectively, for phase-shifting the RF signals. For example, in certain implementations, the phase and amplitude control circuit 9 generates gain control signals for controlling the amount of gain provided by the VGAs 11*a*, 11*b*, . . . 11*n* and phase control signals for controlling the amount of phase shifting provided by the phase shifters 12*a*, 12*b*, . . . 12*n*.

The phased array antenna system 10 operates to generate a transmit beam and/or receive beam including a main lobe pointed in a desired direction of communication. The phased array antenna system 10 realizes increased signal to noise (SNR) ratio in the direction of the main lobe. The transmit beam and/or receive beam also includes one or more side lobes, which point in different directions than the main lobe and are undesirable.

An accuracy of beam direction of the phased array antenna system 10 is based on a precision in controlling the gain and phases of the RF signals communicated via the antennas 6*a*, 6*b*, . . . 6*n*. For example, when one or more of the RF signals has a large phase error, the beam can be broken and/or pointed in an incorrect direction. Furthermore, the size or magnitude of beam side lobe levels is based on an accuracy in controlling the phases and amplitudes of the RF signals.

Accordingly, it is desirable to tightly control the phase and amplitude of RF signals communicated by the antennas 6*a*, 6*b*, . . . 6*n* to provide robust beamforming operations.

Although the phased array antenna system 10 of FIG. 1 depicts one example of an RF communication system that can include one or more antenna arrays, the teachings herein are also applicable to other types of RF communication systems.

Figure 2A:
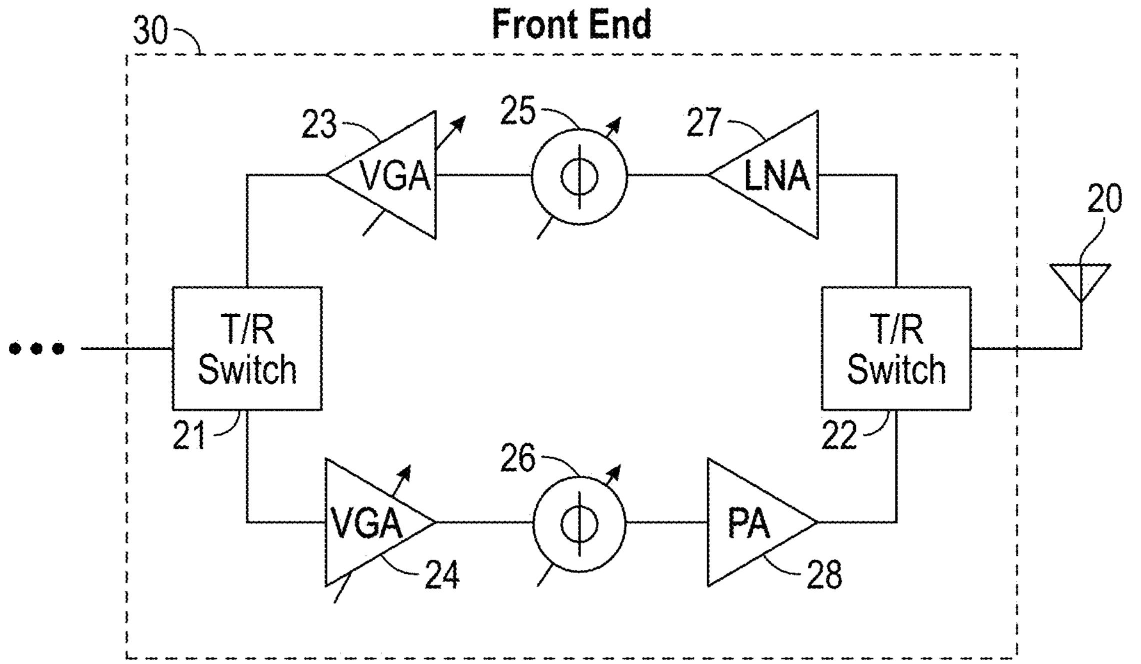
FIG. 2A is a schematic diagram of one embodiment of a front end system.

FIG. 2A is a schematic diagram of one embodiment of a front end system 30. The front end system 30 includes a first transmit/receive (T/R) switch 21, a second transmit/receive switch 22, a receive-path VGA 23, a transmit-path VGA 24, a receive-path controllable phase shifter 25, a transmit-path phase shifter 26, a low noise amplifier (LNA) 27, and a power amplifier (PA) 28. As shown in FIG. 2A, the front end system 30 is depicted as being coupled to an antenna 20, which corresponds to one antenna of an antenna array.

Although FIG. 2A depicts one example of a front end system that can transmit and receive RF signals, the antenna arrays herein can operate in combination with a wide variety of types of RF front ends. Accordingly, other implementations are possible.

The front end system 30 can be included in a wide variety of RF systems, including, but not limited to, phased array antenna systems, such as the phased array antenna system 10 of FIG. 1. For example, multiple instantiations of the front end system 30 can be used to implement the RF front ends 5*a*, 5*b*, . . . 5*n* of FIG. 1. In certain implementations, one or more instantiations of the front end system 30 are fabricated on a semiconductor die or chip.

As shown in FIG. 2A, the front end system 30 includes the receive-path VGA 23 for controlling an amount of amplification provided to an RF input signal received on the antenna 20, and the transmit-path VGA 24 for controlling an amount of amplification provided to an RF output signal transmitted on the antenna 20. Additionally, the front end system 30 includes the receive-path controllable phase shifter 25 for controlling an amount of phase shift to an RF input signal received on the antenna 20, and the transmit-path controllable phase shifter 26 for controlling an amount of phase shift provided to the RF output signal transmitted on the antenna 20.

The gain control provided by the VGAs and the phase control provided by the phase shifters can serve a wide variety of purposes including, but not limited to, compensating for temperature and/or process variation. Moreover, in beamforming applications, the VGAs and phase shifters can control side-lobe levels of a beam pattern.

Figure 2B:
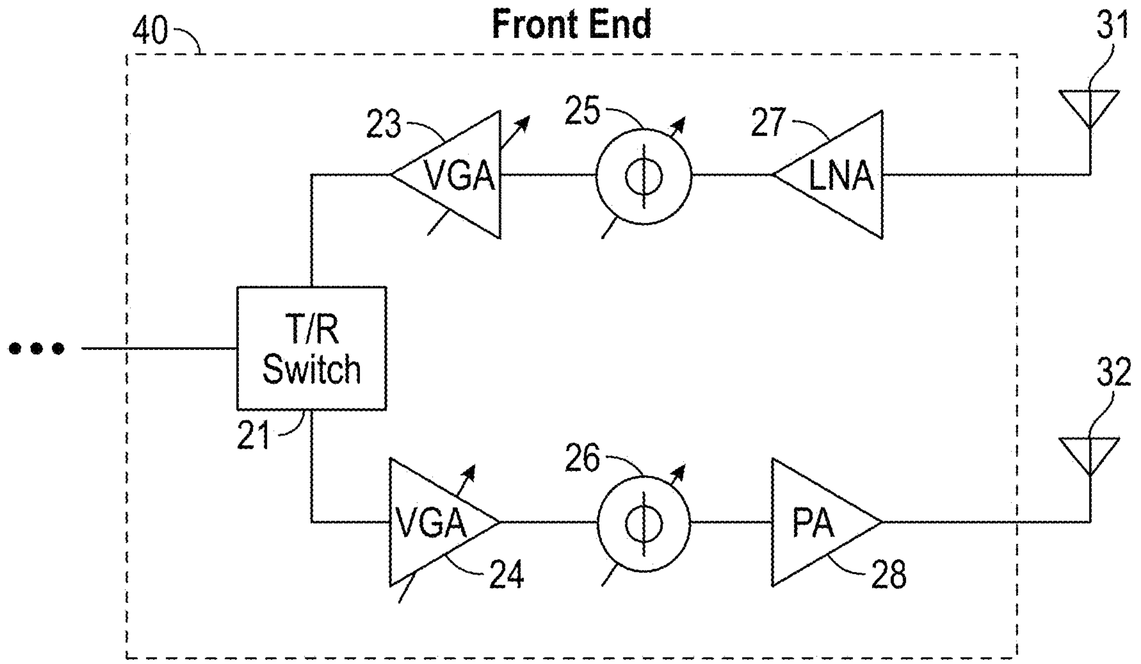
FIG. 2B is a schematic diagram of another embodiment of a front end system.

FIG. 2B is a schematic diagram of another embodiment of a front end system 40. The front end system 40 of FIG. 2B is similar to the front end system 30 of FIG. 2A, except that the front end system 40 omits the second transmit/receive switch 22. As shown in FIG. 2B, the front end system 40 is depicted as being coupled to a receive antenna 31 and to a transmit antenna 32.

The receive antenna 31 and/or the transmit antenna 32 can be included in an antenna array implemented in accordance with any of the embodiments herein. Although FIG. 2B depicts another example of a front end system that can transmit and receive RF signals on antennas, the antenna arrays herein can operate in combination with a wide variety of types of RF front ends. Accordingly, other implementations are possible.

The front end system 40 operates with different antennas for signal transmission and reception. In the illustrated embodiment, the receive-path VGA 23 controls an amount of amplification provided to an RF input signal received on the receive antenna 31, and the transmit-path VGA 24 controls an amount of amplification provided to an RF output signal transmitted on the second antenna 32. Additionally, the receive-path phase shifter 25 controls an amount of phase shift provided to the RF input signal received on the receive antenna 31, and the transmit-path phase shifter 26 controls an amount of phase shift provided to an RF output signal transmitted on the second antenna 32.

Examples of Antenna Arrays with High Isolation Between Antenna Elements

An antenna array can include an array of antennas placed in a two-dimensional arrangement and spaced in a manner to direct radiation in a specific direction. The directed beam can be normal to a plane containing the antenna array or can be titled at a specific angle. For example, antenna arrays with down-tilted beams are attractive for high altitude applications such as base-station towers, indoor access points, and/or roof top communications equipment.

The directed beam from an antenna array has a beam angle that can be controlled by the phase shifts among antenna elements of the antenna array. Such phase shifts are provided by phase shifters that can be fabricated on one or more beamformer integrated circuits (ICs) or chips that feed the antenna array. For example, the RF signals radiated from the antennas of an array combine through constructive and destructive interference to collectively generate a transmit beam having a particular direction.

Antenna arrays suffer from high coupling among adjacent antenna elements within the antenna array. High coupling causes the impedance to be highly dependent on the phases given to the antenna elements by the phase shifters, which makes the array performance degrade with increasing scanning angle.

Having high coupling among the antenna elements limits the possibility of transmitting and/or receiving multiple data streams on the same millimeter wave (mm-wave) circuit board, which is desired for certain applications, such as sixth generation (6G) cellular communications.

An antenna structure can include a first port for a first signal polarization (for instance, horizontal) and a second port for a second signal polarization (for instance, vertical).

When such antennas are arranged in an array, one type of coupling mechanism is co-polarization (co-pol) coupling, which arises from coupling between the same polarization ports of the antennas. For example, co-pol coupling arises from coupling from one horizontally polarized port to another horizontally polarized port, as well as from one vertically polarized port to another vertically polarized port.

Another type of coupling mechanism is cross-polarization (X-pol) coupling, which arises from coupling between the opposite polarization ports of the antennas. For example, X-pol coupling arises from coupling from one horizontally polarized port to a vertically polarized port, as well as from one vertically polarized port to a horizontally polarized port.

Coupling for a typical dual polarization patch antenna array can be of an order of about −15 dB to about −10 dB, while applications for 6G specify coupling below −30 dB. There is a tradeoff between a desire for each antenna to properly radiate and a desire for each antenna to not radiate to adjacent elements to cause coupling.

Figure 3:
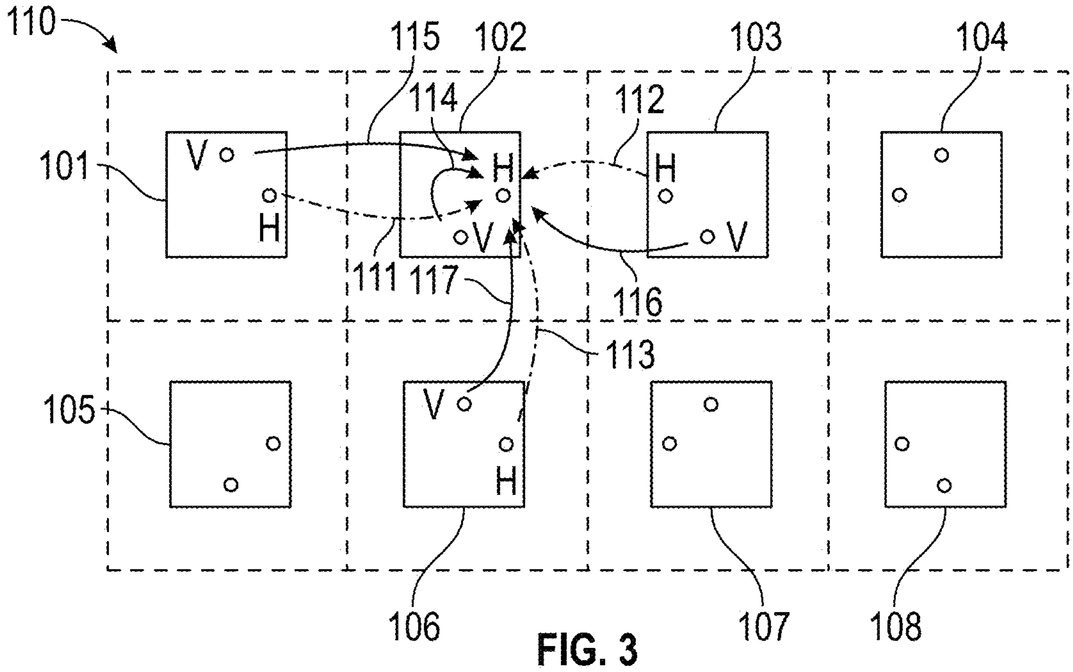
FIG. 3 is a schematic diagram depicting one example of coupling between antenna elements of an antenna array.

FIG. 3 is a schematic diagram depicting one example of coupling between antenna elements of an antenna array 110. As shown in FIG. 3, the antenna array 110 includes patch antenna elements arranged in a two-by-four (2×4) array. The antenna array 110 includes a top row including a first patch antenna element 101, a second patch antenna element 102, a third patch antenna element 103, and a fourth patch antenna element 104. Additionally, the antenna array 110 includes a bottom row including a fifth patch antenna element 105, a sixth patch antenna element 106, a seventh patch antenna element 107, and an eighth patch antenna element 108. Each of the patch antenna elements 101-108 is dual-polarized and includes a horizontally polarized port (H port) for handling a horizontally polarized signal and a vertically polarized port (V port) for handling a vertically polarized signal.

The diagram depicts examples of coupling with respect to the second patch antenna element 102. Although annotations for coupling are shown for the second patch antenna element 102, each of the depicted patch antenna elements suffers from coupling. Furthermore, additional coupling mechanisms exist beyond those that are annotated. Thus, the depicted coupling mechanisms are shown for exemplary purposes only.

As shown in FIG. 3, three examples of co-pol coupling are shown, including co-pol coupling 111 from the H port of the first patch antenna element 101 to the H port of the second patch antenna element 102, co-pol coupling 112 from the H port of the third patch antenna element 103 to the H port of the second patch antenna element 102, and co-pol coupling 113 from the H port of the sixth patch antenna element 106 to the H port of the second patch antenna element 102. Co-pol coupling arises between antenna elements within the same row as well as from antenna elements in different rows.

With continuing reference to FIG. 3, four examples of X-pol coupling are shown, including X-pol coupling 114 from the V port of the second patch antenna element 102 to the H port of the second patch antenna element 102, X-pol coupling 115 from the V port of the first patch antenna element 101 to the H port of the second patch antenna element 102, X-pol coupling 116 from the V port of the third patch antenna element 103 to the H port of the second patch antenna element 102, and X-pol coupling 117 from the V port of the sixth patch antenna element 106 to the H port of the second patch antenna element 102. X-pol coupling arises between antenna elements within the same row as well as from antenna elements in other rows. Furthermore, X-pol coupling arises between different types of ports of the same antenna element as well as from different types of ports of different antenna elements.

Not only do antenna elements of a typical antenna array suffer from high coupling, but the amount of coupling is also a function of beam position. For example, high coupling causes the impedance to be very dependent on the phases given to the antenna elements by the phase shifters, which makes the array performance degrade with increasing scanning angle.

Antenna arrays with high isolation between antenna elements are disclosed herein. In certain embodiments, an antenna array includes at least one primary antenna element (also referred to herein as a master antenna element) and at least one secondary antenna element (also referred to herein as a slave antenna element). The primary antenna element includes a first port of a first signal polarization type (for instance, horizontal) and a second port of a second signal polarization type (for instance, vertical), which are connected to a first signal feed and a second signal feed, respectively. The secondary antenna element includes a first port of the first signal polarization type connected to the first port of the primary antenna element by way of a first signal delay line, and a second port of the second signal polarization type connected to the second port of the primary antenna element by way of a second signal delay line.

Thus, the secondary antenna element includes ports that are connected to the ports of a corresponding primary antenna element by way of signal delay lines. Furthermore, the secondary antenna element shares signal feeds with a corresponding primary antenna element.

The signal feeds are connected to components of a front end system, such as power amplifiers, low noise amplifiers, and/or switches. Thus, the antenna array can be used in combination with phased array circuitry used for providing beamforming.

In certain implementations, the signal delay lines between the ports of the secondary antenna element and the ports of the primary antenna element provide a delay of about half the wavelength of the antenna array at an operation center frequency of the antenna array. For example, in some implementations, the signal delay lines provide a delay of $\lambda/2+/-20\%$, where $\lambda$ is the wavelength of operation of the antenna array.

The antenna array can include multiple primary antenna elements and multiple secondary antenna elements each connected to a corresponding one of the primary antenna elements by way of signal delay lines.

Such an antenna array configuration has been found to exhibit low coupling (for instance, low X-pol).

In certain implementations, the primary antenna elements are arranged such that no two primary antenna elements are directly laterally adjacent or directly vertically adjacent to one another. For example, in some implementations, the primary antenna elements are placed along diagonals of the array. Additionally or alternatively, secondary antenna element(s) and/or empty (null) position(s) in the array can be placed between primary antenna elements to enhance isolation.

The primary and secondary antenna elements can be arranged in a variety of ways in accordance with the disclosure. Certain array configurations are provided to achieve progressive phase shifts over the array and wide scanning capabilities.

The antenna arrays disclosed herein can be small and formed using printed circuit board (PCB) technology. The antenna arrays can be arranged in an array configuration desired for a particular application, such as 6G cellular. Furthermore, the antenna arrays can be used to transmit and/or receive RF signals, including millimeter wave signals.

Figure 4:
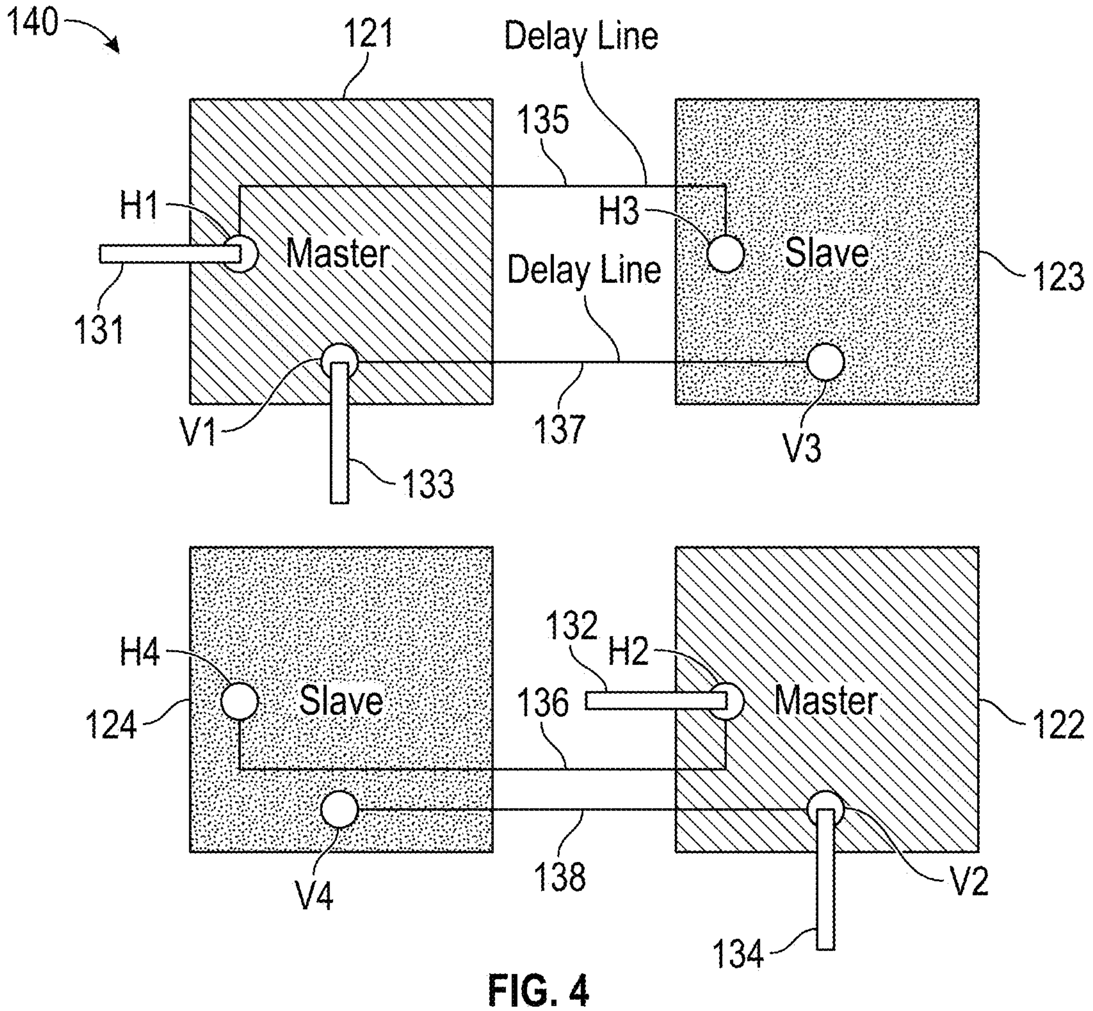
FIG. 4 is a schematic diagram of one embodiment of an antenna array.

FIG. 4 is a schematic diagram of one embodiment of an antenna array 140. The antenna array 140 includes a first primary antenna element 121 (or first master antenna element 121), a second primary antenna element 122 (or second master antenna element 122), a first secondary antenna element 123 (or first slave antenna element 123), a second secondary antenna element 124 (or second slave antenna element 124), a first horizontally polarized signal feed 131, a second horizontally polarized signal feed 132, a first vertically polarized signal feed 133, a second vertically polarized signal feed 134, a first horizontally polarized signal delay line 135, a second horizontally polarized signal delay line 136, a first vertically polarized signal delay line 137, and a second vertically polarized signal delay line 138.

Although an example of a 2×2 antenna array is shown, the antenna arrays disclosed herein can be arranged in a wide variety of ways. Such arrays include not only uniform arrays of m rows by n columns of antennas (where m and n are each an integer greater than or equal to 1), but also to non-uniform arrays.

As shown in FIG. 4, the first primary antenna element 121 includes a horizontally polarized port (H1 port) and a vertically polarized port (V1 port). Additionally, the second primary antenna element 122 includes a horizontally polarized port (H2 port) and a vertically polarized port (V2 port). Furthermore, the first secondary antenna element 123 includes a horizontally polarized port (H3 port) and a vertically polarized port (V3 port). Additionally, the second secondary antenna element 124 includes a horizontally polarized port (H4 port) and a vertically polarized port (V4 port).

In the illustrated embodiment, the first horizontally polarized signal feed 131 is connected to the H1 port. Additionally, the first horizontally polarized signal delay line 135 is connected between the H1 port and the H3 port. Furthermore, the first vertically polarized signal feed 133 is connected to the V1 port. Additionally, the first vertically polarized signal delay line 137 is connected between the V1 port and the V3 port. Furthermore, the second horizontally polarized signal feed 132 is connected to the H2 port. Additionally, the second horizontally polarized signal delay line 136 is connected between the H2 port and the H4 port. Furthermore, the second vertically polarized signal feed 134 is connected to the V2 port. Additionally, the second vertically polarized signal delay line 138 is connected between the V2 port and the V4 port.

Accordingly, the first primary antenna element 121 is directly connected to the signal feeds 131/133, while the first secondary antenna element 123 is indirectly connected to the signal feeds 131/133 by way of the signal delay lines 135/137, respectively. Furthermore, the second primary antenna element 122 is directly connected to the signal feeds 132/134, while the second secondary antenna element 124 is indirectly connected to the signal feeds 132/134 by way of the signal delay lines 136/138, respectively.

Such an antenna array configuration has been found to exhibit low coupling (for instance, low X-pol).

In the illustrated embodiments, the primary antenna elements 121/122 are placed along a diagonal of the antenna array 140. Positioning the primary antenna elements 121/122 in this manner provides a further reduction in coupling.

Figure 5:
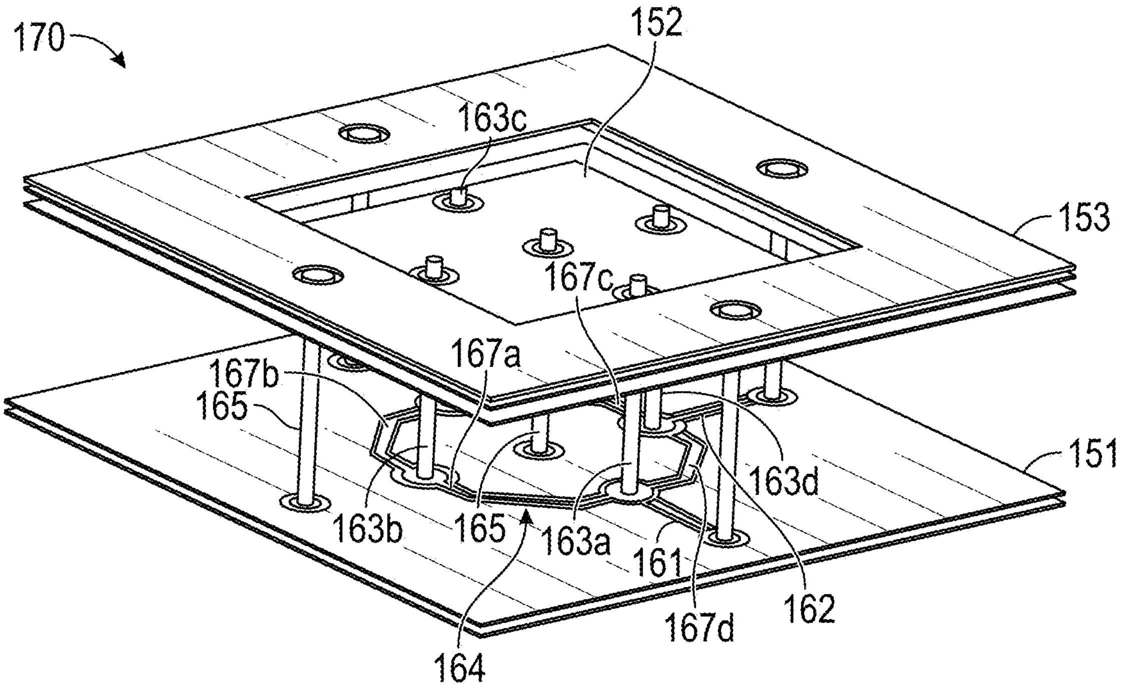
FIG. 5 is a schematic diagram of one embodiment of an antenna element for an antenna array.

FIG. 5 is a schematic diagram of one embodiment of an antenna element 170 for an antenna array. The antenna element 170 depicts one example of an antenna element that can serve as a master antenna element or a slave antenna element in the antenna arrays herein. Although one example of an antenna element is shown, the teachings herein are applicable to other types of antenna elements.

In the illustrated embodiment, the antenna element 170 includes a ground plane 151, a patch antenna element 152, a shielding structure 153 (implemented as a layered metallic bounding frame, in this example), a vertically polarized signal feed 161, a horizontally polarized signal feed 162, a first signal via 163*a*, a second signal via 163*b*, a third signal via 163*c*, a fourth signal via 163*d*, a ring balun 164, and parasitic monopoles 165.

The vertically polarized signal feed 161 receives a vertically polarized signal, while the horizontally polarized signal feed 162 receives a horizontally polarized signal. The vertically polarized signal and the horizontally polarized signal are each provided to two different points along the ring balun 164. For example, the vertically polarized signal is provided to a first point of the ring balun 164 at the first via 163*a*, while the horizontally polarized signal is provided to a second point of the ring balun 164 at the fourth via 163*d*.

As shown in FIG. 5, a first section 167*a* of the ring balun 164 is connected between the first via 163*a* and the second via 163*b*. Additionally, a second section 167*b* of the ring balun 164 is connected between the second via 163*b* and the third via 163*c*, a third section 167*c* of the ring balun 164 is connected between the third via 163*c* and the fourth via 163*d*, and a fourth section 167*d* of the ring balun 164 is connected between the fourth via 163*d* and the first via 163*a*.

In certain implementations, each section 167*a*-167*d* of the ring balun 164 provides a delay of about λ/4 (for instance, λ/4+/−20%). Implementing the ring balun 164 in this manner provides signal component cancellation that aids in exciting the patch antenna element 152 with the vertically polarized signal and the horizontally polarized signal.

The ring balun 164 provides improved excitation of the patch antenna element 152 by differentially exciting the patch antenna element 152 for each of vertical and horizontal signal polarizations. For example, the first signal via 163*a* can carry a non-inverted component of the horizontally polarized signal while the third signal via 163*c* can carry an inverted component of the horizontally polarized signal. Thus, the first signal via 163*a* and the 163*c* carry a differential representation of the horizontally polarized signal and serve to differentially excite the patch antenna element 152 at two points. Likewise, the fourth signal via 163*d* can carry a non-inverted component of the vertically polarized signal while the second signal via 163*b* can carry an inverted component of the vertically polarized signal.

The coupling of each signal via 163*a*-163*d* to the patch antenna element 152 is by capacitive coupling (the antenna element is parasitically excited) in this embodiment to prevent internal looping for the signals.

In certain implementations, the signal vias 163*a*-163*d* and the parasitic monopoles 165 have a height of about λ/4.

In certain implementations, antenna element 170 is formed on a circuit board, such as a printed circuit board (PCB). For example, the ground plane 151, the patch antenna element 152, and the shielding structure 153 can be formed on different conductive layers of the PCB and separated from one another by dielectric. Additionally, the depicted vias can be formed through the PCB's dielectric. Thus, an antenna array including various antenna elements implemented in accordance with FIG. 5 can be formed using PCB technologies in which metallization is patterned on different conductive layers of a circuit board and interconnected by vias.

Figure 6:
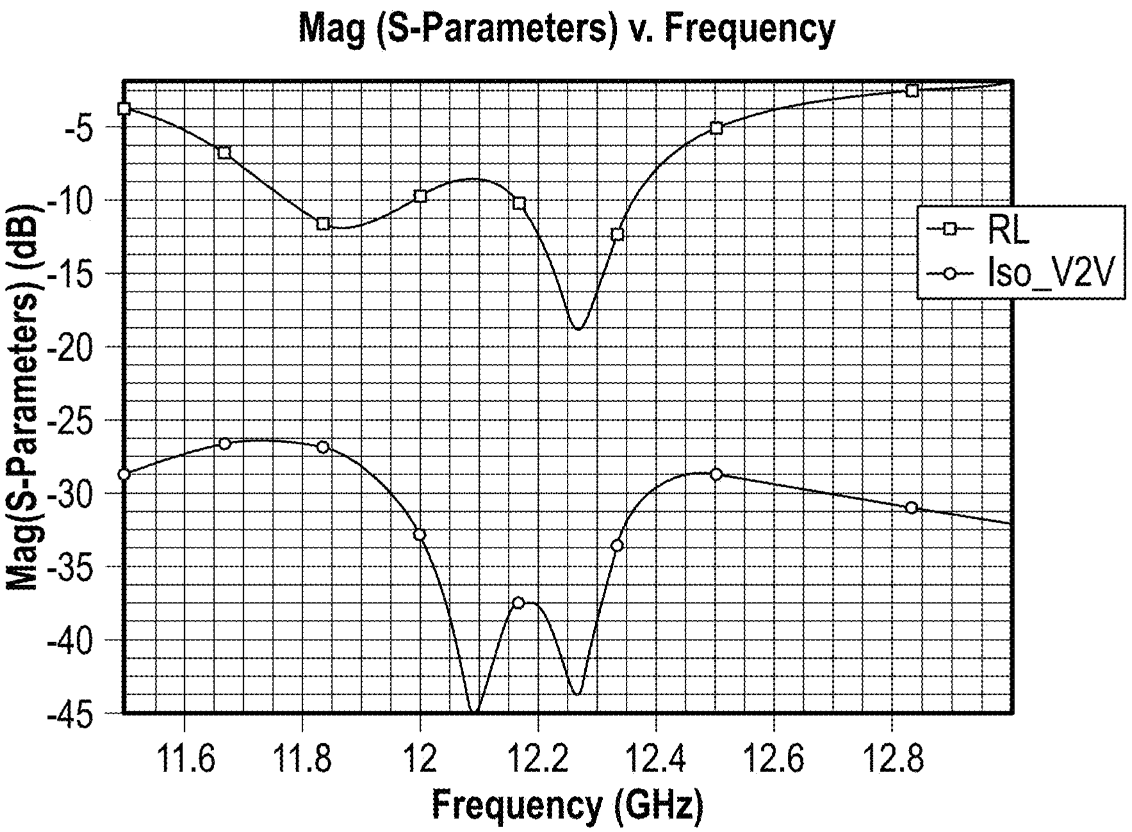
FIG. 6 is a graph of one example of return loss and isolation for an antenna array.

FIG. 6 is a graph of one example of return loss and isolation for an antenna array. The graph includes plots of both return loss (RL) and isolation between vertical ports (V2V) for one implementation of an antenna array including the antenna elements 170. The V2V isolation plot is taken for antenna elements along a diagonal of the array (for instance, in an implementation of the antenna array 140 of FIG. 4 using the antenna elements 170 of FIG. 5).

Figure 7A:
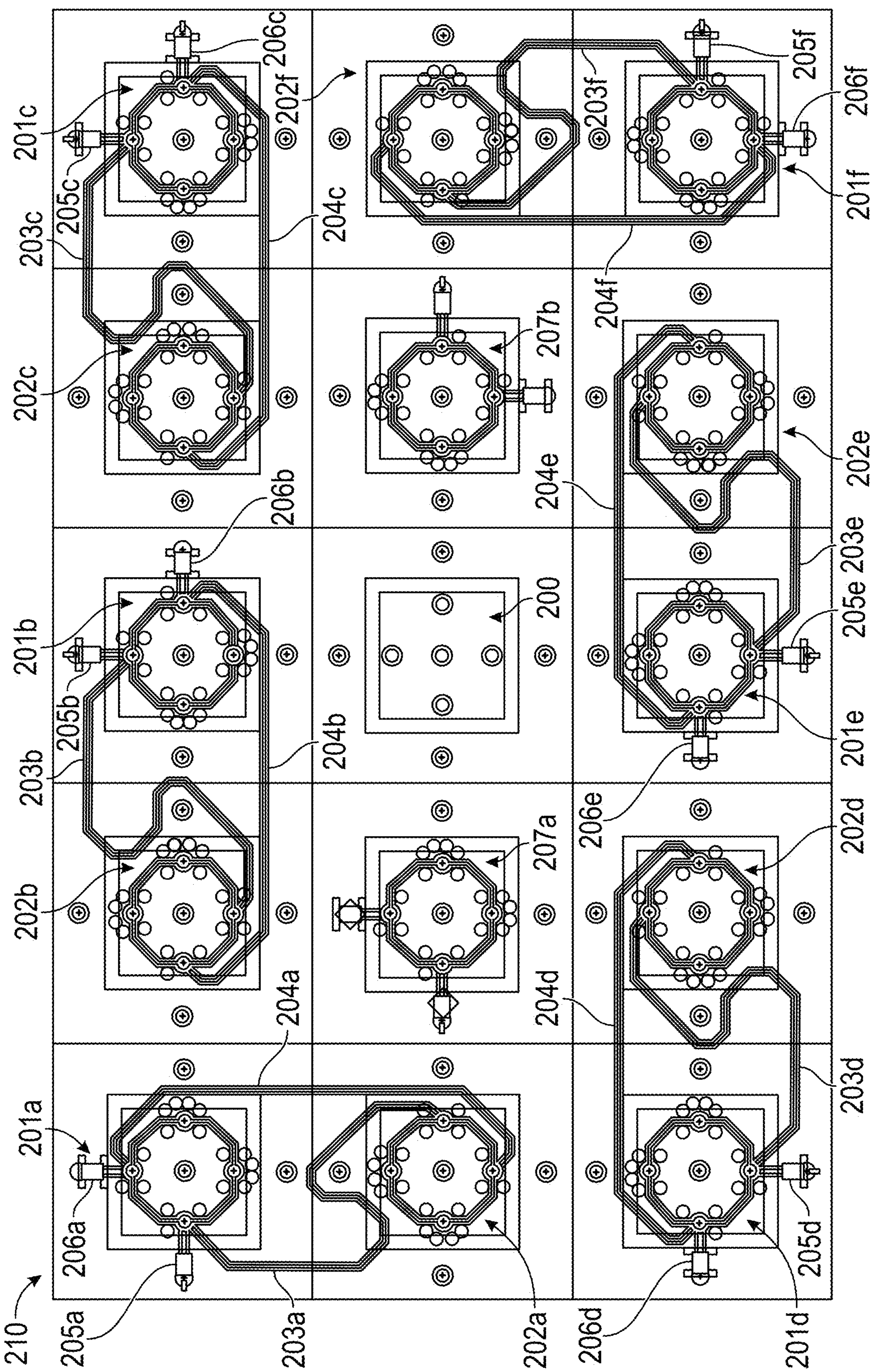
FIG. 7A is a schematic diagram of another embodiment of an antenna array.

FIG. 7A is a schematic diagram of another embodiment of an antenna array 210. The antenna array 210 includes antenna elements implemented in accordance with the embodiment of FIG. 5.

As shown in FIG. 7A, the antenna array 210 includes a first master (primary) antenna element 201*a*, a first slave (secondary) antenna element 202*a*, a second master antenna element 201*b*, a second slave antenna element 202*b*, a third master antenna element 201*c*, a third slave antenna element 202*c*, a fourth master antenna element 201*d*, a fourth slave antenna element 202*d*, a fifth master antenna element 201*e*, a fifth slave antenna element 202*e*, a sixth master antenna element 201*f*, and a sixth slave antenna element 202*f*. The antenna array 210 further includes a first independent antenna element 208*a* and a second independent antenna element 208*a* (which are not associated with a master/slave relationship) as well as an empty (null) element 200 in which no antenna element is present.

In the illustrated embodiment, the first master antenna element 201*a* is fed by a pair of dual polarization signal feeds 205*a*/206*a*, the second master antenna element 201*b* is fed by a pair of dual polarization signal feeds 205*b*/206*b*, the third master antenna element 201*c* is fed by a pair of dual polarization signal feeds 205*c*/206*c*, the fourth master antenna element 201*d* is fed by a pair of dual polarization signal feeds 205*d*/206*d*, the fifth master antenna element 201*e* is fed by a pair of dual polarization signal feeds 205*e*/206*e*, and the sixth master antenna element 201*f* is fed by a pair of dual polarization signal feeds 205*f*/206*f*.

With continuing reference to FIG. 7A, the ports of the first slave antenna element 202*a* are coupled to the ports of the first master antenna element 201*a* by a pair of signal delay lines 203*a*/204*a*. Additionally, the ports of the second slave antenna element 202*b* are coupled to the ports of the second master antenna element 201*b* by a pair of signal delay lines 203*b*/204*b*, the ports of the third slave antenna element 202*c* are coupled to the ports of the third master antenna element 201*c* by a pair of signal delay lines 203*c*/204*c*, the ports of the fourth slave antenna element 202*d* are coupled to the ports of the fourth master antenna element 201*d* by a pair of signal delay lines 203*d*/204*d*, the ports of the fifth slave antenna element 202*e* are coupled to the ports of the fifth master antenna element 201*e* by a pair of signal delay lines 203*e*/204*e*, and the ports of the sixth slave antenna element 202*f* are coupled to the ports of the sixth master antenna element 201*f* by a pair of signal delay lines 203*f*/204*f*.

The depicted antenna elements are arranged in a 3×5 array, in this example. As shown in FIG. 7A, the first row of the antenna array 210 includes (from left to right in the diagram) the first master antenna element 201*a*, the second slave antenna element 202*b*, the second master antenna element 201*b*, the third slave antenna element 202*c*, and the third master antenna element 201*c*. Additionally, the second row of the antenna array 210 includes (from left to right in the diagram) the second slave antenna element 202*a*, the first independent antenna element 207*a*, the empty antenna element 200, the second independent antenna element 207*b*, and the sixth slave antenna element 202*f*. Furthermore, the third row of the antenna array 210 includes (from left to right in the diagram) the fourth master antenna element 201*d*, the fourth slave antenna element 202*d*, the fifth master antenna element 201*e*, the fifth slave antenna element 202*e*, and the sixth master antenna element 201*f*.

Thus, corresponding pairs of master and slave antenna elements are both positioned laterally and vertically, in this example.

Figure 7B:
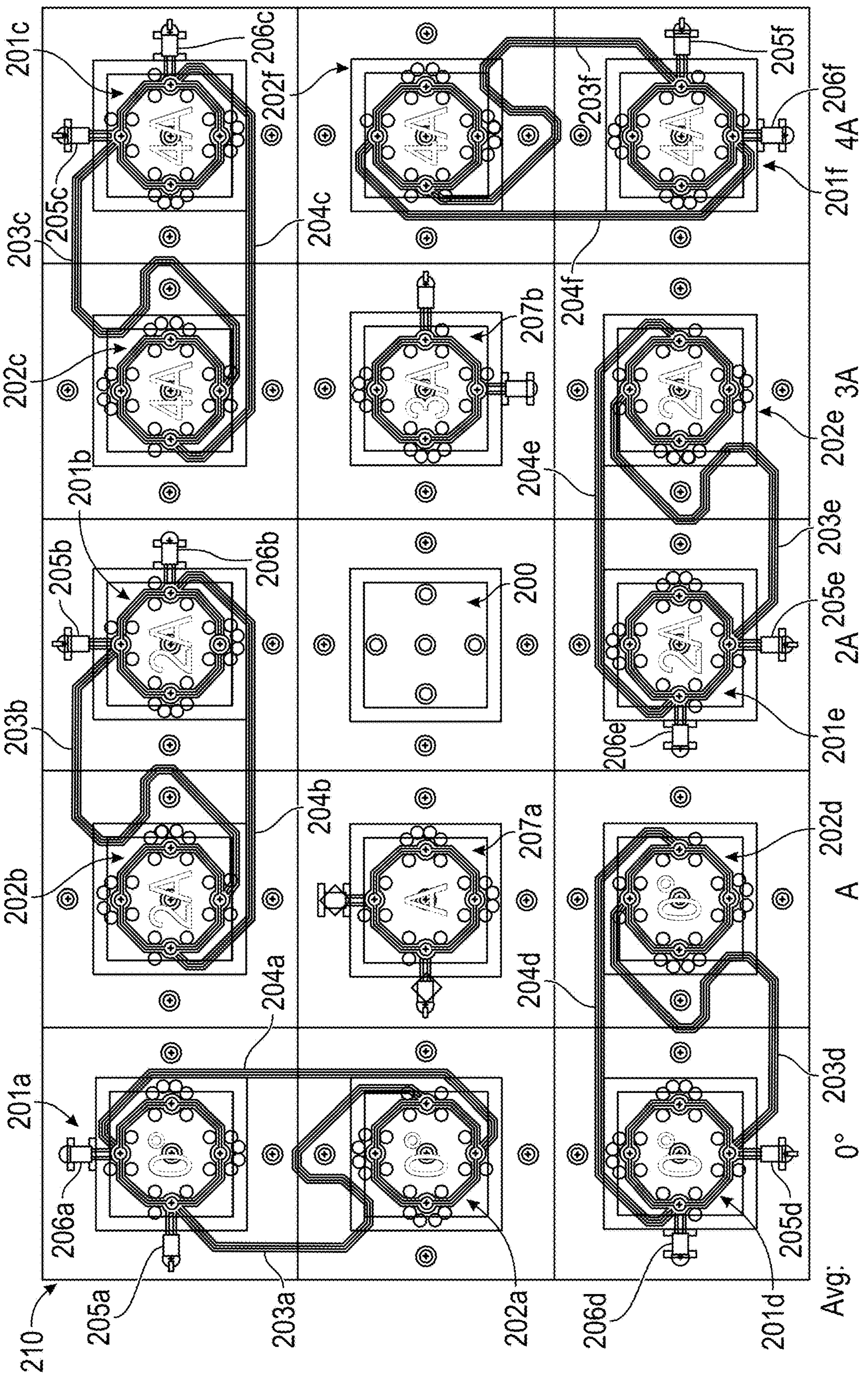
FIG. 7B is a schematic diagram of one example of beam scanning values for the antenna array of FIG. 7A.

FIG. 7B is a schematic diagram of one example of beam scanning values (0°, A, 2A, 3A, or 4A as shown) for the antenna array 210 of FIG. 7A.

With reference to FIGS. 7A and 7B, the antenna array 210 can provide both wide scanning angle and high isolation. For example, FIG. 7B depicts an example of scanning from left-to-right, in which progressive phase (A) is applied to achieved a desired scanning angle θ. For example, A and θ can be related by A=k*d*sin(θ), where k is a constant, d is the interelement spacing, and sin( ) is the mathematic sine function.

Figure 8:
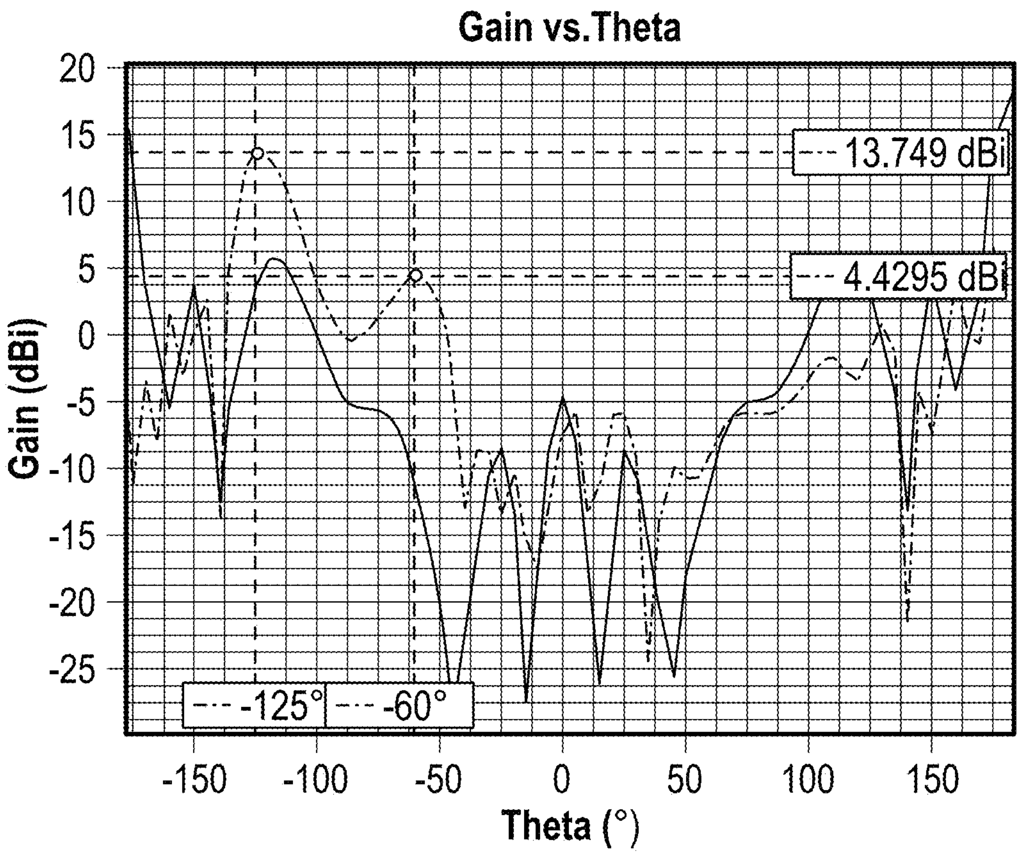
FIG. 8 is a graph of one example of gain versus scanning angle for an antenna array.

FIG. 8 is a graph of one example of gain versus scanning angle for one implementation of the antenna array 210 of FIG. 7. Gain versus scanning angle is shown for both signal polarizations.

Figure 9:
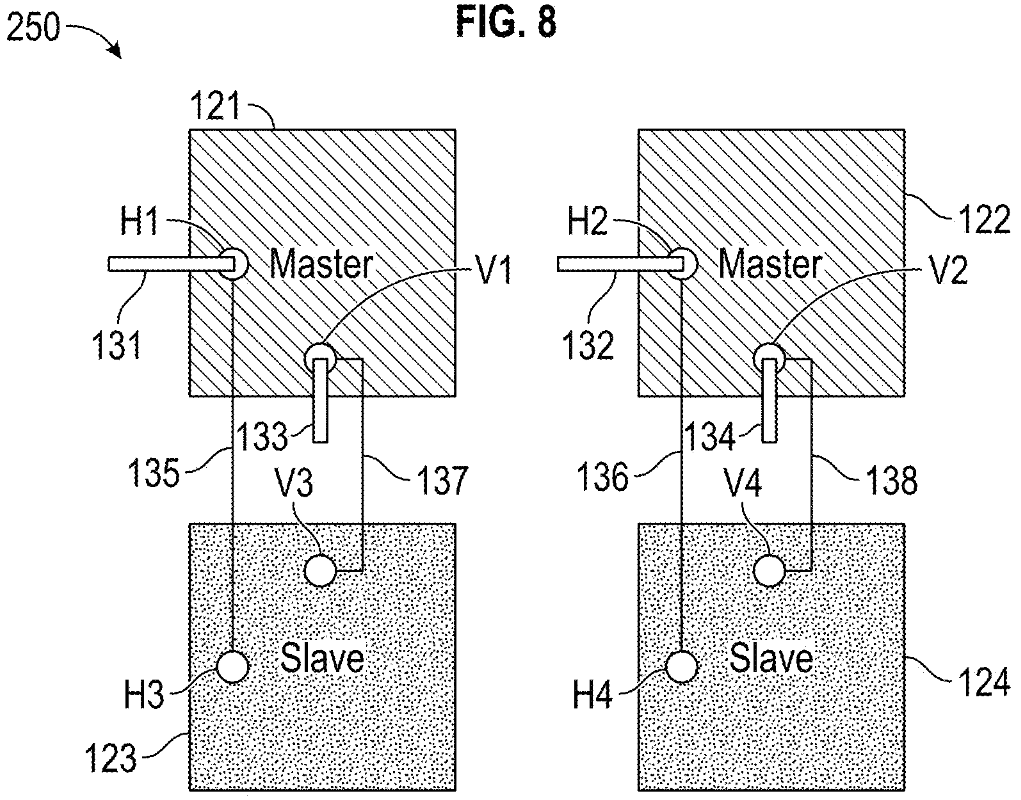
FIG. 9 is a schematic diagram of another embodiment of an antenna array.

FIG. 9 is a schematic diagram of another embodiment of an antenna array 250. The antenna array 250 of FIG. 9 is similar to the antenna array 140 of FIG. 4, except that in the antenna array 250 of FIG. 9, the first master antenna element 121 and the second master antenna element 122 are adjacent to one another in a common row. Likewise, in the antenna array 250 of FIG. 9, the first slave antenna element 123 and the second slave antenna element 124 are adjacent to one another in a common row.

The antenna array 250 of FIG. 9 can be suitable for applications in which the scanning angle requirements are more relaxed in one direction relative to another direction. However, by placing master antenna elements directly adjacent to one another in a common row, the isolation is degraded. Such isolation can occur not only laterally in the diagram, but vertically as well.

Figure 10:
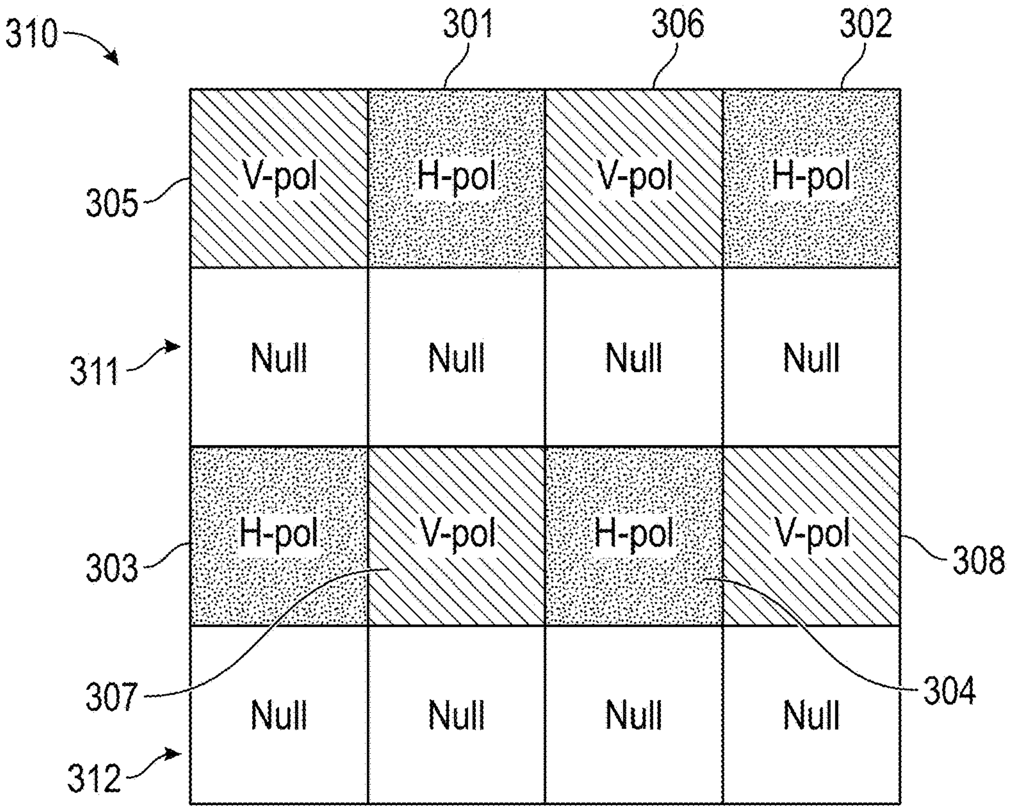
FIG. 10 is a schematic diagram of another embodiment of an antenna array.

FIG. 10 is a schematic diagram of another embodiment of an antenna array 310. The antenna array 310 is implemented as a 4×4 array. The first row of the antenna array 310 includes (from left to right) a first vertically polarized antenna element 305, a first horizontally polarized antenna element 301, a second vertically polarized antenna element 306, and a second horizontally polarized antenna element 302. Additionally, the second row of the antenna array 310 is a null row 311 that does not include any antenna elements. Furthermore, the third row of the antenna array 310 includes (from left to right) a third horizontally polarized antenna element 303, a third vertically polarized antenna element 307, a fourth horizontally polarized antenna element 304, and a fourth vertically polarized antenna element 308. Additionally, the fourth row of the antenna array 310 is a null row 312 that does not include any antenna elements.

The antenna array 310 has partitioned each antenna element into a vertically polarized antenna element or a horizontally polarized antenna element. Thus, rather than including dual polarizations for each antenna element, each antenna element has either a horizontal or vertical polarization for enhanced isolation. Additionally, empty cells have been included in the array to further enhance isolation.

Any of the embodiments herein can include antenna elements that are separated into horizontal or vertical polarizations for enhanced isolation and/or empty (null) cells for enhanced isolation.

Figure 11A:
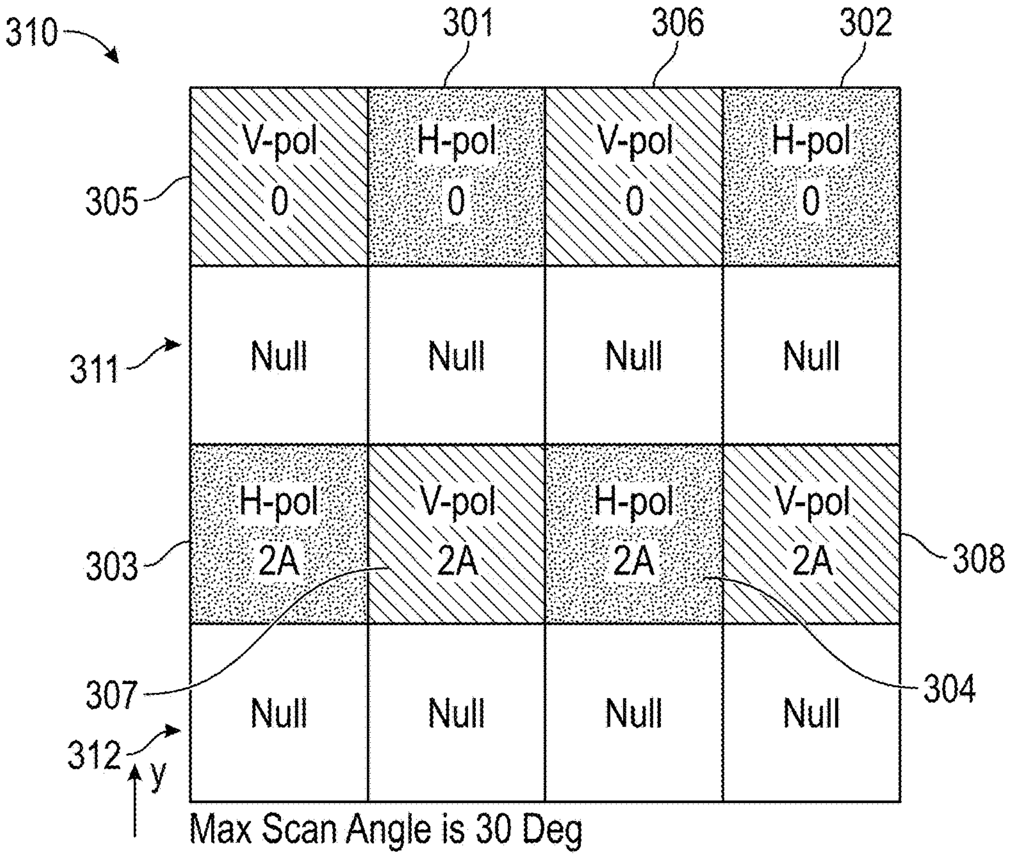
FIG. 11A is a schematic diagram of one example of beam scanning values for the antenna array of FIG. 10.
Figure 11B:
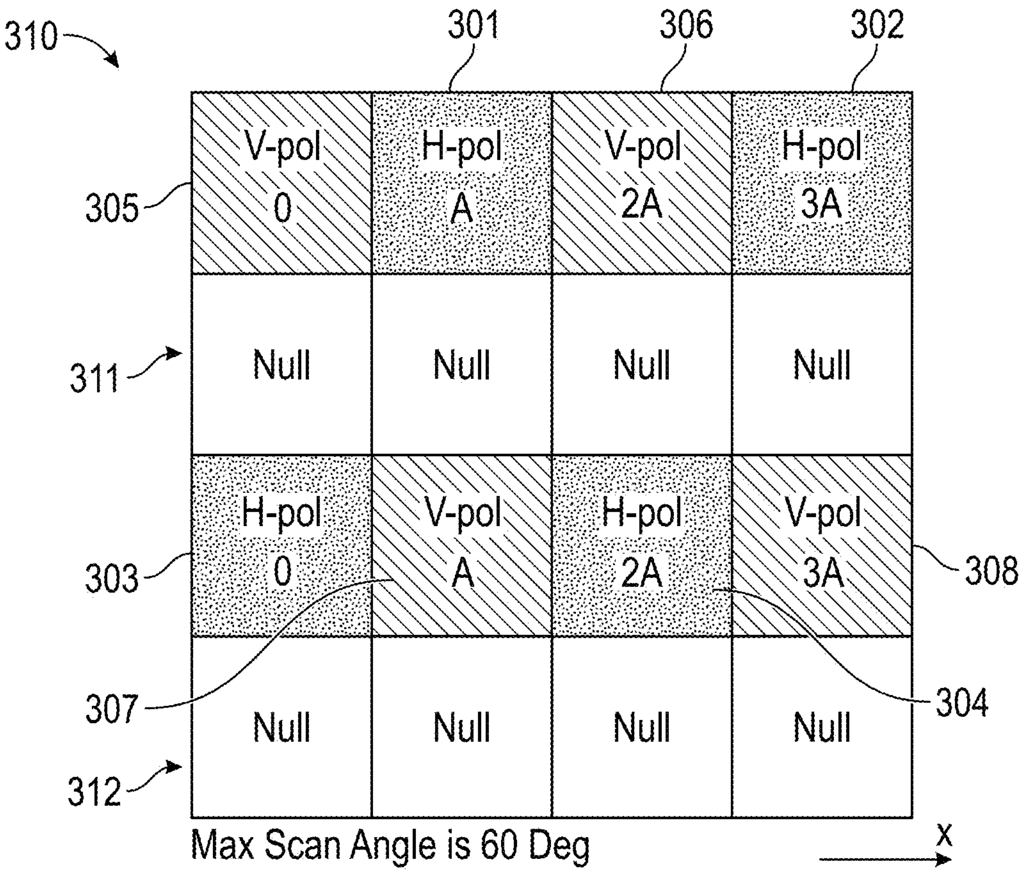
FIG. 11B is a schematic diagram of another example of beam scanning values for the antenna array of FIG. 10.

FIG. 11A is a schematic diagram of one example of beam scanning values for the antenna array 310 of FIG. 10. FIG. 11B is a schematic diagram of another example of beam scanning values for the antenna array 310 of FIG. 10.

In FIG. 11A, an example of progressive phase values for scanning in a vertical (y) direction is shown. In this example, the maximum vertical scan angle is 30°.

In FIG. 11B, an example of progressive phase values for scanning in a horizontal (x) direction is shown. In this example, the maximum horizontal scan angle is 60°.

Applications

Devices employing the above-described schemes can be implemented into various electronic devices. Examples of electronic devices include, but are not limited to, RF communication systems, consumer electronic products, electronic test equipment, communication infrastructure, etc. For instance, one or more antenna arrays can be included in a wide range of RF communication systems, including, but not limited to, radar systems, base stations, mobile devices (for instance, smartphones or handsets), phased array antenna systems, laptop computers, tablets, and/or wearable electronics.

The teachings herein are applicable to RF communication systems operating over a wide range of frequencies, including not only RF signals between 100 MHz and 7 GHz, but also to higher frequencies, such as those in the X band (about 7 GHz to 12 GHz), the $K_u$ band (about 12 GHz to 18 GHz), the K band (about 18 GHz to 27 GHz), the $K_a$ band (about 27 GHz to 40 GHz), the V band (about 40 GHz to 75 GHz), and/or the W band (about 75 GHz to 110 GHz). Accordingly, the teachings herein are applicable to a wide variety of RF communication systems, including microwave communication systems.

The RF signals wirelessly communicated by the antenna arrays herein can be associated with a variety of communication standards, including, but not limited to, Global System for Mobile Communications (GSM), Enhanced Data Rates for GSM Evolution (EDGE), Code Division Multiple Access (CDMA), wideband CDMA (W-CDMA), 3G, Long Term Evolution (LTE), 4G, 5G and/or 6G, as well as other proprietary and non-proprietary communications standards.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments.

What is claimed is:

1. An antenna array comprising:

a primary antenna element having a first port of a first signal polarization type;

a first signal feed directly connected to the first port of the primary antenna element;

a secondary antenna element having a first port of the first signal polarization type; and a first signal delay line directly connecting the first port of the primary antenna element to the first port of the secondary antenna element.

2. The antenna array of claim 1, wherein the primary antenna element further includes a second port of a second signal polarization type, and the secondary antenna element further includes a second port of the second signal polarization type, wherein the first signal polarization type is horizontal and the second signal polarization type is vertical.

3. The antenna array of claim 2, the antenna array further comprising a second signal feed having a first end directly connected to the second port of the primary antenna element and a second signal delay line having a first end directly connected to the second port of the primary antenna element and a second end directly connected to the second port of the secondary antenna element.

4. The antenna array of claim 2, further comprising one or more null elements in the antenna array providing neither horizontal nor vertical polarization.

5. The antenna array of claim 1, wherein the primary antenna element further includes a second port of a second signal polarization type and a ring balun, the first port of the primary antenna element and the second port of the primary antenna element connected along different points of the ring balun.

6. The antenna array of claim 1, wherein a length of the first delay line is about equal to half of a wavelength of the antenna array.

7. The antenna array of claim 1, further comprising a plurality of primary antenna elements including the primary antenna element, wherein the plurality of primary antenna elements are positioned along a diagonal of the antenna array.

8. The antenna array of claim 1, wherein the secondary antenna element shares signal feeds with the primary antenna element and does not include any dedicated signal feeds.

9. A radio frequency communication system comprising:

a front end system; and an antenna array electrically connected to the front end system, the antenna array comprising:

a primary antenna element having a first port of a first signal polarization type;

a first signal feed directly connected to the first port of the primary antenna element;

a secondary antenna element having a first port of the first signal polarization type; and a first signal delay line directly connecting the first port of the primary antenna element to the first port of the secondary antenna element.

10. The radio frequency communication system of claim 9, wherein the primary antenna element further includes a second port of a second signal polarization type, and the secondary antenna element further includes a second port of the second signal polarization type, wherein the first signal polarization type is horizontal and the second signal polarization type is vertical.

11. The radio frequency communication system of claim 10, the antenna array further comprising a second signal feed having a first end directly connected to the second port of the primary antenna element and a second signal delay line having a first end directly connected to the second port of the primary antenna element and a second end directly connected to the second port of the secondary antenna element.

12. The radio frequency communication system of claim 10, further comprising one or more null elements in the antenna array providing neither horizontal nor vertical polarization.

13. The radio frequency communication system of claim 9, wherein the primary antenna element further includes a second port of a second signal polarization type and a ring balun, the first port of the primary antenna element and the second port of the primary antenna element connected along different points of the ring balun.

14. The radio frequency communication system of claim 9, wherein the antenna array further comprises a plurality of primary antenna elements including the primary antenna element, wherein the plurality of primary antenna elements are positioned along a diagonal of the antenna array.

15. The radio frequency communication system of claim 9, wherein the secondary antenna element shares signal feeds with the primary antenna element and does not include any dedicated signal feeds.

16. The radio frequency communication system of claim 9, wherein the front end system includes at least one of a power amplifier, a low noise amplifier, or a switch connected to the first signal feed.

17. A method of antenna array formation, the method comprising:

forming a primary antenna element having a first port of a first signal polarization type;

forming a first signal feed directly connected to the first port of the primary antenna element;

forming a secondary antenna element having a first port of the first signal polarization type; and forming a first signal delay line directly connecting the first port of the primary antenna element to the first port of the secondary antenna element.

18. The method of claim 17, wherein the primary antenna element further includes a second port of a second signal polarization type, and the secondary antenna element further includes a second port of the second signal polarization type, wherein the first signal polarization type is horizontal and the second signal polarization type is vertical.

19. The method of claim 18, further comprising forming a second signal feed having a first end directly connected to the second port of the primary antenna element, and forming a second signal delay line having a first end directly connected to the second port of the primary antenna element and a second end directly connected to the second port of the secondary antenna element.

20. The method of claim 17, further comprising forming a ring balun and a second port of a second signal polarization type for the primary antenna element, the first port of the primary antenna element and the second port of the primary antenna element connected along different points of the ring balun.

* * * * *